US011878441B2

(12) United States Patent
Tchoukov et al.

(10) Patent No.: US 11,878,441 B2
(45) Date of Patent: Jan. 23, 2024

(54) LOW CORROSION RELEASE AGENT FOR LIGNO-CELLULOSIC COMPOSITES

(71) Applicant: Guardian Chemicals Inc., Sturgeon County (CA)

(72) Inventors: Plamen Tchoukov, Edmonton (CA); Jason Westgeest, Edmonton (CA); Kevin Kropp, Edmonton (CA)

(73) Assignee: Guardian Chemicals Inc., Sturgeon County (CA)

( * ) Notice: Subject to any disclaimer, the term of this patent is extended or adjusted under 35 U.S.C. 154(b) by 357 days.

(21) Appl. No.: 15/836,174

(22) Filed: Dec. 8, 2017

(65) Prior Publication Data
US 2019/0176361 A1  Jun. 13, 2019

(51) Int. Cl.
*B27N 3/08* (2006.01)
*B29C 33/60* (2006.01)
(Continued)

(52) U.S. Cl.
CPC .............. *B27N 3/083* (2013.01); *B29C 33/60* (2013.01); *C08G 18/6492* (2013.01); *C08G 18/7664* (2013.01); *C08G 2125/00* (2013.01)

(58) Field of Classification Search
CPC ... B27N 1/00; B27N 3/02; B27N 3/04; B27N 3/083; B29C 33/60; C08G 18/6492; C08G 18/7664; C08G 2125/00; B01J 19/004
See application file for complete search history.

(56) References Cited

U.S. PATENT DOCUMENTS 5,322,554 A  6/1994 DeLong
5,472,455 A * 12/1995 Mehreteab ............... C11D 1/65
                                                     510/283
(Continued)

OTHER PUBLICATIONS

Chemmax, Sodium Alpha-Olefin Sulfonate (AOS), Chemmax China, http://www.chemmax.com.cn/product/alpha_olefin_sulfonate.htm.
(Continued)

*Primary Examiner* — Shuangyi Abu Ali
(74) *Attorney, Agent, or Firm* — Laurie Wright; Christopher N. Hunter; Blake, Cassels & Graydon LLP

(57) ABSTRACT

The present inversion provides a low corrosion external release agent for ligno-cellulose composite panels comprising two or more anionic surfactants selected from the following groups where at least one of the anionic surfactants is selected from a) or b):
an ethoxylated phosphate ester or a salt thereof having the formula

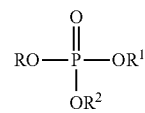

wherein,
R, $R^1$ and $R^2$ are independently selected from the group consisting of H, and C6-C30 alkyl having an average of 1-20 moles of ethoxylation,
with the proviso that at least one of R, $R^1$ and $R^2$ is H and the other one or two of R, $R^1$ and $R^2$ is C6-C30 alkyl haying an average of 1-20 moles of ethoxylation, and
b) a phosphate ester or a salt thereof haying the formula.
(Continued)

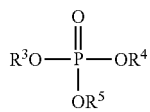

wherein,
$R^3$, $R^4$ and $R^5$ are independently selected from the group consisting of H, and C6-C18 alkyl Chain,
with the proviso that at least one of $R^3$, $R^4$ and $R^5$ is H and the other one or two of $R^3$, $R^4$ and $R^5$ is C6-C18 alkyl chain, and
c) an organic sulfur containing anionic surfactant or a salt thereof.

16 Claims, 1 Drawing Sheet

(51) Int. Cl.
*C08G 18/64* (2006.01)
*C08G 18/76* (2006.01)

(56) References Cited

U.S. PATENT DOCUMENTS

| | | | |
|---|---|---|---|
| 6,471,905 | B1 | 10/2002 | Hass et al. |
| 8,309,503 | B2 | 11/2012 | Jiping et al. |
| 8,551,238 | B2 | 10/2013 | Massidda et al. |
| 8,882,898 | B2 | 11/2014 | Jiping et al. |
| 9,120,827 | B2 * | 9/2015 | Balbo Block ........... B29C 33/62 |
| 2005/0242459 | A1 | 11/2005 | Savino et al. |
| 2008/0004357 | A1 * | 1/2008 | Meyer ................. A61K 8/0208 |
| | | | 516/54 |

OTHER PUBLICATIONS

Chemblink, C8-10-Alkyl Alcohols ethoxylated phosphates [68130-47-2], http://www.chemblink.com/products/68130-47-2.htm.
Parchem, C8-C10 Alcohol POE(4) Phosphate Ester, https://www.parchem.com/chemical-supplier-distributor/C8-C10-Alcohol-POE-4-Phosphate . . . .
Phosphate Esters, Lakeland Laboratories Limited, Manufacturers of Speciality Surfactants.

* cited by examiner

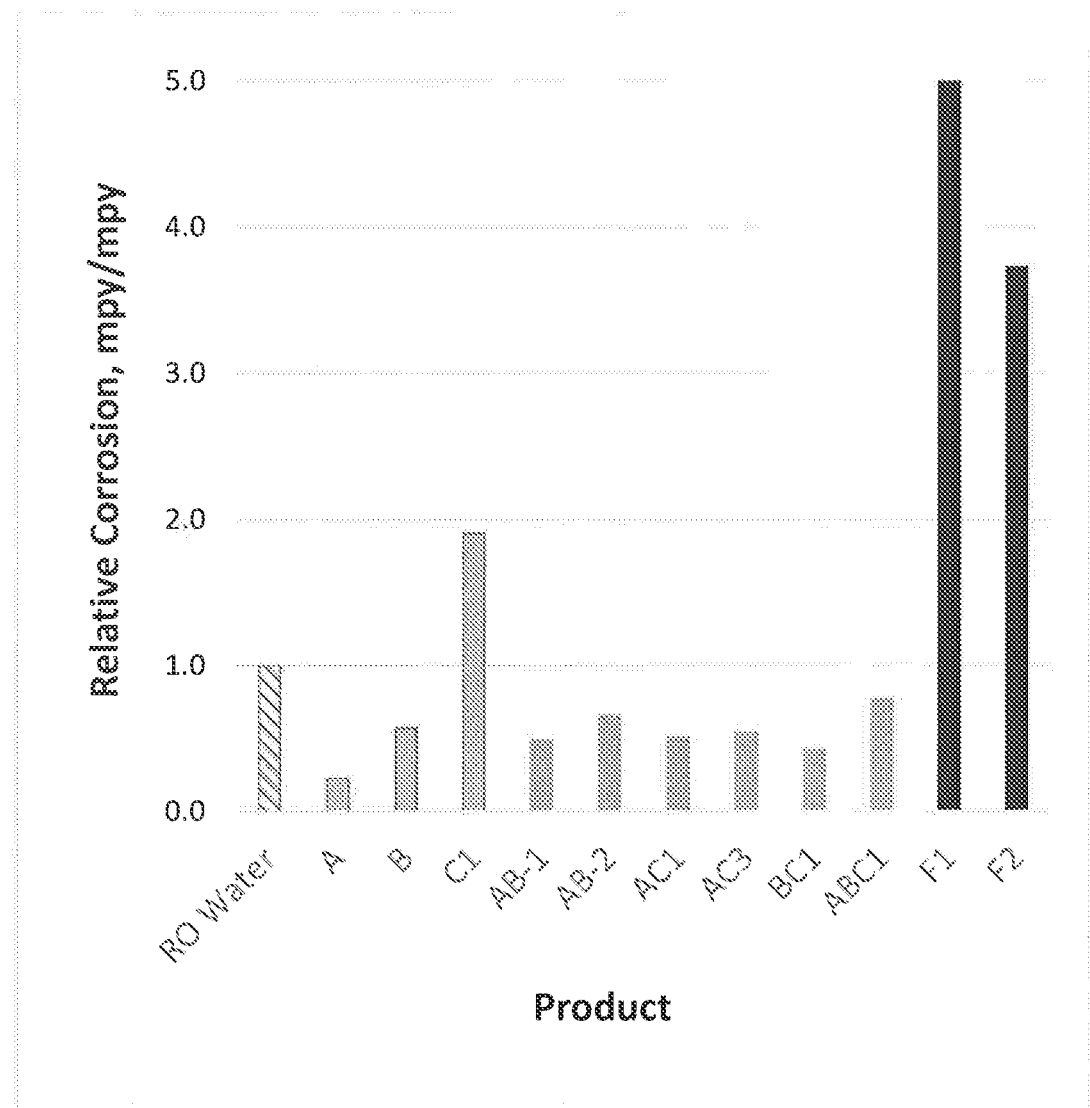

LOW CORROSION RELEASE AGENT FOR LIGNO-CELLULOSIC COMPOSITES

TECHNICAL FIELD

The present invention is directed to a novel release agent designed for use in production of manufactured ligno-cellulosic composites, in particular fiberboard, particle board and oriented strand hoard (OSB) using polyisocyanate adhesives/binders such as polymeric methylene diphenyl diisocyanate (pMDI). The novel release agent provides low corrosion for metal surfaces, excellent release characteristics and panel colour in both multi-opening (daylight) press processes as well as continuous press processes.

BACKGROUND

The manufacture of engineered wood products from ligno-cellulosic fibers, chips, strands or particles is well known. These ligno-cellulosic materials are used to form a variety of composite materials including fiberboard, chip-board, particle board, structure board and oriented strand board (OSB). As well, composites formed from other cellulosic materials such as straw are also well known. Typically, the ligno-cellulosic fibers, chips, strands or particles are mixed with a suitable adhesive and wax emulsion and the mixture is then matted and pressed under high pressure and temperature to form a rigid, dense panel.

The adhesives commonly employed in the manufacture of engineered wood products from ligno-cellulosic fibers or chips include formaldehyde based resins or isocyanate hinders. Formaldehyde based resins such as urea (UF) or phenol formaldehyde (PE) are produced by reacting urea/phenol with formaldehyde under alkaline conditions. UF and PE resins have been used for many years however concerns have been raised about the safety, production, use and handling of such resins. These issues combined with the advantages of isocyanate binders such as superior adhesion and water resistance have led to isocyanates such as polymeric methylene diphenyl diisocyanate (pMDI) being the preferred adhesives. However, despite these advantages there are drawbacks as pMDI provides adhesion not only for the ligno-cellulosic fibers, but also for the boards to the metal press platens, caul plates, screens or belts used in the manufacturing process. Therefore, some producers of wood products manufactured from ligno-cellulosic fibers or chips will use a surface layer of wood fibers or chips containing phenol formaldehyde resin instead of pMDI, and use pMDI in the core layer of the board to prevent the adhesion between pMDI in the mat and the metal surfaces. This complicated surface-core sandwiching process has increased the cost of hoard manufacturing and has prevented the industry from benefiting fully from pMDI adhesive.

There have been attempts to overcome the above bonding to the metal surfaces through the use of release agents. Many conventional release agents as used in the industry do not provide satisfactory release with pMDI. Typically release agents utilized are either internal release agents which are mixed into the fibers or chips along with the adhesive, or external release agents which are applied after the mat is formed and prior to pressing. External release agents are generally applied to either the press parts such as the platens, caul plates, screens, belts, etc. or to the surface of the fiber or chip mat prior to the pressing operation. The use of some external release agents requires elaborate and costly processes for pre-treatment of the press platens, such as applying the external release agents using multiple coatings and baking the platens, Internal release agents can provide good release, but must be applied in high concentration of up to 80% solids in order to achieve sufficient concentration at the mat surface and may require much lower press temperatures and longer press time, thus increasing production time and cost. Some release agents such as those based on silicones may remain associated with the finished board surface and thus affect the paint-ability of the board.

We have previously developed and patented (U.S. Pat. No. 8,309,503 issued Nov. 13, 2012) a release agent composition for use with a pMDI adhesive comprising equal parts of a mixture of an alkali metal salt of tall oil fatty acid and an alkali metal salt of an ethoxylated phosphate ester. This formulation was a solution marketed as PRESS-GUARD™ (Guardian Chemicals Inc.) and had certain advantages when sprayed on the strand mat, press platens, caul plates, screens or belts using spray bar systems, which are commonly used in North America, However, when it was attempted to apply the release agent by other methods which agitate the release agent, such as spinning disc spray or rotating roller systems, which are popular in Europe and Asia, it was found that the agitation and turbulence of those methods caused unacceptable foaming of the release agent. This tendency to foam impacted the release agent application rate resulting in reduced coverage and performance.

In order to overcome this, we developed a pMDI release agent which has, significantly reduced or eliminated foaming tendencies and provided effective release between the board and the metal surfaces in conventional processes. This release agent utilized an emulsion consisting of an alkali metal salt of an ethoxylated phosphate ester and fatty acid. This formulation is described in U.S. Pat. No. 8,882,898 issued Nov. 11, 2014.

The above formulations have proven to be very effective release agents particularly when utilized as external release agents sprayed on the mats or press platens, caul plates, screens belts utilized in the press operation. However, it was found that, similar to many other prior art release agent formulations, the release agents described above did not sufficiently suppress the corrosive tendencies of the water itself given dissolved oxygen content and the exacerbated corrosive effects at high press temperatures. In some cases, it has been found that the release agents themselves, because of the presence of corrosive components, such as fatty acids or EDTA, may contribute to accelerated corrosion rates to the mild steel surfaces utilized in these processes.

In the past it has been proposed to add anti-corrosive components to the release agent formulation to overcome this corrosion. One example of this is taught in U.S. Pat. No. 8,551,238 issued to Massidda et al. on Oct. 8, 2013 which describes an anti-corrosive package containing at least one oxygen scavenger that binds dissolved oxygen within an aqueous carrier; and at least one film forming corrosion inhibitor, that may be added to release agents to reduce these corrosive effects. in particular, this anti-corrosive package is directed to mitigating the corrosion caused by fatty acids. However, commonly used corrosion inhibitors, such as those set out in the patent, may have significant drawbacks including toxicity, foul odours particularly at the high temperatures employed in composite presses, increased costs and potential to negatively affect panel properties and release.

There thus remains a need for a release agent formulation which on its own has significantly lower corrosion to the metal surfaces with equivalent or better performance and can be utilized at low enough concentrations to be economically feasible.

SUMMARY OF THE INVENTION

The present invention is directed to a release agent for use with isocyanate based adhesives such as pMDI that is simple to manufacture and use, provides release between the ligno-cellulosic composite panels and the metal surfaces, allows for production of ligno-cellulosic composite panels, in particular OSB at high temperature, without causing excessive press buildup, adverse discoloration of the panel or corrosion to the metal surfaces of the press.

In an aspect of the invention, there is provided a low corrosion external release agent for ligno-cellulosic composite panels comprising two or more anionic surfactants selected from the following groups where at least one of the anionic surfactants is selected from a) or b):

a) an ethoxylated phosphate ester or a salt thereof having the formula

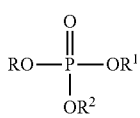

wherein,
R, $R^1$ and $R^2$ are independently selected from the group consisting of H, and C6-C30 alkyl chain having an average of 120 moles of ethoxylation,
with the proviso that at least one of R, $R^1$ and $R^2$ is H and the other one or two of R, $R^1$ and $R^2$ is C6-C30 alkyl chain having an average of 1-20 moles of ethoxylation, and b) a phosphate ester or a salt thereof having the formula

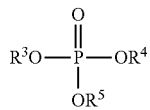

wherein,
$R^3$, $R^4$ and $R^5$ are independently selected from the group consisting of H, and C6-C18 alkyl chain,
with the proviso that at least one of $R^3$, $R^4$ and $R^5$ is H and the other one or two of $R^3 R^4$ and $R^5$ is C6-C18 alkyl chain, and c) an organic sulfur containing anionic surfactant or a salt thereof.

In another aspect of the invention, there is provided a method for applying an external release agent to a ligno-cellulosic fiber, chip, strand or particle mat or metal surface of a press used in the manufacture of an engineered wood product, the method comprising:

1) providing an external release agent comprising two or more anionic surfactants selected from the following groups where at least one of the anionic surfactants is selected from a) or b):

a) an ethoxylated phosphate ester or a salt thereof having the formula

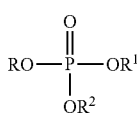

wherein,
R, $R^1$ and $R^2$ are independently selected from the group consisting of H, and C6-C30 alkyl chain having an average of 1-20 moles of ethoxylation,
with the proviso that at least one of R, $R^1$ and $R^2$ is H and the other one or two of R, $R^1$ and $R^2$ is C6-C30 alkyl chain having an average of 1-20 moles of ethoxylation, and b) a phosphate ester or a salt thereof having the formula

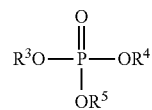

wherein,
$R^3$, $R^4$ and $R^5$ are independently selected from the group consisting of H, and C6-C18 alkyl chain,
with the proviso that at least one of $R^3$, $R^4$ and $R^5$ is H and the other one or two of $R^3$, $R^4$ and $R^5$ is C6-C18 alkyl chain, and c) an organic sulfur containing anionic surfactant 2) loading the external release agent in an application system, and 3) thereafter applying the external release agent to one or more of the ligno-cellulosic fiber, chip, strand or particle mat or metal surface of a press using said application system.

In an aspect of the invention, the organic sulfur containing anionic surfactant is a sulfonate, sulfate or a disulfonate.

In a further aspect of the invention, the sulfonate has the formula

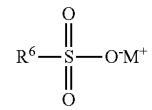

wherein $R^6$ is a C6-C24 carbon chain which may be aliphatic or aromatic, linear or branched, saturated or unsaturated, ethoxylated or propoxylated or combinations thereof and M is a monovalent cation.

In another aspect of the invention, the sulfate has the formula

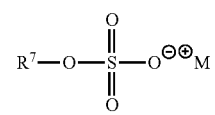

wherein $R^7$ is a C6-C24 carbon chain which may be aliphatic or aromatic, linear or branched, saturated or unsaturated, ethoxylated or propoxylated or combinations thereof and M is a monovalent cation.

In yet another aspect of the invention, the disulfonate has the formula

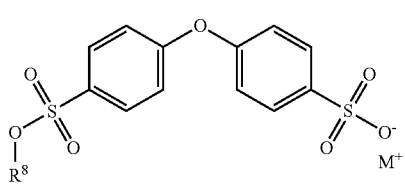

wherein $R^8$ is a C6-C24 carbon chain which may be aliphatic or aromatic, linear or branched, saturated or unsaturated, ethoxylated or propoxylated combinations thereof and M is a monovalent cation.

In the above, it is understood that for ethoxylated surfactants such as the phosphate ester described in (a) that the ethoxylation value represents an average thus making this a general description for the mixture which may in fact contain a number of different homologs both higher and lower in ethoxylation than the range listed.

In another aspect of the invention, the release agent composition comprises
(a) one or more phosphate esters selected from a); and
(b) one or more phosphate esters selected from b).

In another aspect of the invention, the release agent composition comprises
(a) 2-45% by weight of one or more phosphate esters selected from a);
(b) 2-45% by weight of one or more phosphate esters selected from b); and
(c) 10-96% by weight water and optionally an agent to adjust the pH of the composition.

In another aspect of the invention, the release agent composition comprises
(a) 2-25% by weight of one or more phosphate esters selected from a);
(b) 2-25% by weight of one or more phosphate esters selected from b); and
(c) 50-96% by weight water and optionally an agent to adjust the pH of the composition.

In a further aspect of the invention, the release agent composition comprises
(a) 5-20% by weight of one or more phosphate esters selected from a);
(b) 2-15% by weight of one or more phosphate esters selected from b); and
(c) 65-93% by weight water and optionally an agent to adjust the pH of the composition.

In another aspect of the invention, the ratio of the phosphate ester selected from a) to the phosphate ester selected from b) is between 1:6 and 6:1.

In a further aspect of the invention, the ratio of the phosphate ester selected from a) to the phosphate ester selected from b) is between 1:4 and 4:1.

In a further aspect of the invention, the ratio of the phosphate ester selected from a) to the phosphate ester selected from b) is between 1:2 and 4:1.

In yet a further aspect of the invention, the ratio of the phosphate ester selected from a) to the phosphate ester selected from b) is between 1:1 and 3:1.

In another aspect of the invention, the release agent composition comprises
(a) one or more phosphate esters selected from a) and/or b); and.
(b) one or more organic sulfur containing anionic surfactants.

In another aspect of the invention, the release agent composition comprises
(a) 2-45% by weight of one or more phosphate esters selected from a) and/or b);
(b) 2-45% by weight of one or more organic sulfur containing anionic surfactants; and
(c) 1.0-96% by weight water and optionally an agent to adjust the pH of the corn position.

In another aspect of the invention, the release agent composition comprises
(a) 2-25% by weight of one or more phosphate esters selected from a) and/or b);
(b) 2-25% by weight of one or more organic sulfur containing anionic surfactants; and
(c) 50 96% $^{by}$ weight water and optionally an agent to adjust the pH of the composition.

In yet another aspect of the invention, the release agent composition comprises
(a) 4-20% by weight of one or more phosphate esters selected from a) and/or h);
(b) 2-25% by weight of one or more organic sulfur containing anionic surfactants; and
(c) 55-94% by weight water and optionally an agent to adjust the pH of the composition.

In another aspect of the invention, at least one of R, $R^1$ and $R^2$ as C6-C22 alkyl chain having 1-16 moles of ethoxylation.

In another aspect of the invention, at least one of R, $R^1$ and $R^2$ is C6-C18 alkyl chain having 1-14 moles of ethoxylation.

In another aspect of the invention, at least one of R, $R^1$ and $R^2$ is C6-C12 alkyl chain having 1-12 moles of ethoxylation.

In another aspect of the invention, at least one of R, $R^1$ and $R^2$ is C8-C11 alkyl chain having 1-8 moles of ethoxylation.

In another aspect of the invention, the phosphate ester of group b) is a mixture of C8-C16 alkyl phosphate esters.

In another aspect of the invention, the phosphate ester of group b) is a mixture of 8 and C10 alkyl phosphate esters.

In a further aspect of the invention, $R^6$ of the sulfonate is a C12-C18 alpha olefin group.

In another aspect of the invention, $R^6$ of the sulfonate is a C14-C16 alpha olefin group and M is Na.

In an aspect of the invention, $R^7$ of the sulfate is a C8-C16 alkyl group,.

In an aspect of the invention, $R^7$ of the sulfate is a C12 alkyl group and M is Na.

In an aspect of the invention, $R^8$ of the disulfonate is a C8-C16 alkyl group.

In an aspect of the invention, $R^8$ of the disulfonate is a C12 alkyl group and M is Na.

In an aspect of the invention, the salt of the components of the present invention are preferably monovalent cation salts. Preferably, the salts are alkali metal salts, amines or other monovalent cations. More preferably, the salts are alkali metal salts, most preferably alkali metal salts such as sodium or potassium.

BRIEF DESCRIPTION OF THE DRAWINGS

Preferred embodiments of the invention are shown in the drawings, wherein:

FIG. 1 illustrates the results of the corrosion tests.

DETAILED DESCRIPTION OF THE PREFERRED EMBODIMENTS

The present invention is directed to a low corrosion external release agent for ligno-cellulosic composite panels, particularly those formed using an isocyanate based adhesive such as pMDI. The external release agent of the present invention provides for release properties similar to or better than those of prior art formulations while providing significantly less corrosion of the metal surfaces of the presses. The release agent of the present invention can be used in any of the press operations commonly utilized in the art including continuous or multi-opening (daylight) presses.

The low corrosion external release agent composition for use with ligno-cellulosic composite panels utilizing a pMDI adhesive of the present invention comprises two or more anionic surfactants selected from the following groups where at least one of the anionic surfactants is selected from a) or b):

a) an ethoxylated phosphate ester or a salt thereof having the formula

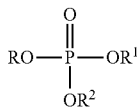

wherein,

R, $R^1$ and $R^2$ are independently selected from the group consisting of H, and C6-C30 alkyl chain having an average of 1-20 moles of ethoxylation, with the proviso that at least one of R, $R^1$ and $R^2$ is H and the other one or two of R, $R^1$ and $R^2$ is C6-C30 alkyl chain having an average of 1-20 moles of ethoxylation, and b) a phosphate ester or a salt thereof having the formula

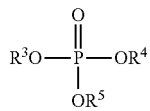

wherein, $R^3$, $R^4$ and $R^5$ are independently selected from the group consisting of H, and C6-C18 alkyl chain, with the proviso that at least one of $R^3$, $R^4$ and $R^5$ is H and the other one or two of $R^3$, $R^4$ and $R^5$ is C6-C18 alkyl chain, and c) an organic sulfur containing anionic surfactant or a salt thereof.

The phosphate ester as defined in group a) is preferably a long C chain phosphate ester having a C6-C30 alkyl group with an average of 1 to 20 moles of ethoxylation. Preferably, the phosphate ester as defined in group a) is a phosphate ester having a C6-C22 alkyl group with an average of 1 to 16 moles of ethoxylation, more preferably C6-C18 alkyl group with an average of 1 to 14 moles of ethoxylation, more preferably between C6-C12. alkyl group with an average of 1 to 12 moles of ethoxylation, and most preferably a C8-C11 alkyl group with an average of 1 to 8 moles of ethoxylation. Straight or branched chains or cyclic groups of the phosphate ester may be used, The phosphate ester may be a mono-ester, a di-ester or a mixture of mono- and di-esters. An example of a preferred phosphate ester as defined in group a) is Poly(oxy-1,2-ethanediyl), α-hydro-ω-hydroxy-mono C6-C12-alkyl ethers, phosphates, (CAS 68921-24-4).

The phosphate ester defined in group b) is preferably a C6-C18 monoester or diester or a mixture of C6-C18 monoesters. More preferably, the phosphate ester defined in group b) is a C8-C16 monoester or diester or a mixture of C8-C16 monoesters. Most preferably, the phosphate ester defined in group b) is a mixture of C8 and C10 monoesters, (CAS 3921-30-0 and CAS 3991-73-9).

The organic sulfur containing anionic surfactant defined in group c) is preferably sulfonate, sulfate or a disulfonate.

The sulfonate preferably has the formula

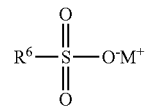

wherein $R^6$ is a C6-C24 carbon chain which may be aliphatic or aromatic, linear or branched, saturated or unsaturated, ethoxylated or propoxylated or combinations thereof and M is a monovalent cation. $R^6$ is preferably a C12-C18 alpha olefin group, most preferably a C14-C16 alpha olefin group.

The sulfate preferably has the formula

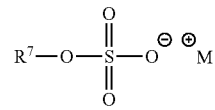

wherein $R^7$ is a C6-C24 carbon chain which may be aliphatic or aromatic, linear or branched, saturated or unsaturated, ethoxylated or propoxylated or combinations thereof and M is a monovalent cation. $R^7$ is preferably a C8-C16 alkyl group, most preferably a C12 alkyl group.

The disulfonate preferably has the formula

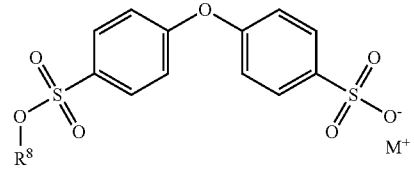

wherein $R^8$ is a C6-C24 carbon chain which may be aliphatic or aromatic, linear or branched, saturated or unsaturated, ethoxylated or propoxylated or combinations thereof and M is a monovalent cation. $R^8$ is preferably a C8-C16 alkyl group, most preferably a C12 alkyl group.

The salts of the components of the present invention are preferably monovalent cation salts. Preferably, the salts of the phosphate esters and M of the organic sulfur containing anionic surfactant are alkali metal salts, amines or other monovalent cations. More preferably, the salts and M are alkali metal salts, most preferably the salts and M are sodium or potassium.

In one preferred embodiment, the release agent composition comprises (a) one or more phosphate esters selected from a); and
(b) one or more phosphate esters selected from b).

Preferably, the release agent composition comprises (a) 2-45% by weight of one or more phosphate esters selected from a);
(b) 2-45% by weight of one or more phosphate esters selected from b); and
(c) 10-96% by weight water and. optionally an agent to adjust the pH of the composition, Preferably, this embodiment of the release agent composition comprises (a) 2-25% by weight of one or more phosphate esters selected from a);
(b) 2-25% by weight of one or more phosphate esters selected from b); and (c) 50-96% by weight water and optionally an agent to adjust the pH of the composition.

More preferably, this embodiment of the release agent comprises (a) 5-20% by weight of one or more phosphate esters selected from a);

(b) 2-15% by weight of one or more phosphate esters selected from b); and (c) 65-93% by weight water and optionally an agent to adjust the pH of the composition.

In this embodiment, preferably the ratio of the phosphate ester selected from a) to the phosphate ester selected from h) is between 1:6 and 6:1, More preferably the ratio of the phosphate ester selected from a) to the phosphate ester selected from b) is between 1:4 and 4:1, more preferably between 1:2 and 4:1. Most preferably, the ratio of the phosphate ester selected from a) to the phosphate ester selected from b) is between 1:1 and 3:1.

In another embodiment of the invention, the release agent composition comprises (a) one or more phosphate esters selected from a) and/or b); and (b) one or more organic sulfur containing anionic surfactants.

In this embodiment, preferably the release agent composition comprises (a) 2-45% by weight of one or more phosphate esters selected from a) and/or b);

(b) 2-45% by weight of one or more organic sulfur containing anionic surfactants; and (c) 10-96% by weight water and optionally an agent to adjust the pH of the composition.

More preferably, this embodiment of the release agent composition comprises (a) 2-25% by weight of one or more phosphate esters selected from a) and/or b);

(b) 2-25% by weight of the organic sulfur containing anionic surfactant; and (c) 10-96% by weight water and optionally an agent to adjust the pH of the composition.

Most preferably, the low corrosion external release comprises (a) 4-20% by weight of one or more phosphate esters selected from a) and/or b);

(b) 2-25% by weight of the organic sulfur containing anionic surfactant; and (c) 55-94% by weight water and optionally an agent to adjust the of the composition.

The release agents of the present invention may also utilize a mixture of more than two of the anionic surfactants.

In addition to the anionic surfactants, the composition will contain water and optionally an agent to adjust the pH to the preferred range of 4 to 12, most preferably a range of pH of about pH6 to about pH 10. These agents can include alkali metal hydroxides, or amines. Preferably, an alkali metal hydroxide, most preferably NaOH or KOH is used to adjust the pH.

In addition, the composition of the present invention may also contain other components so long as they do not affect the release and corrosion inhibition properties of the release agent. For example, the release agent of the present invention may include a suitable preservative such as 2-bromo-2-nitropropane-1,3-diol, 5-chloro-2-methyl-4-isothiazolin-3-one, 2-methyl-4-isothiazolin-3-one or 1,3-benzothiazol-2-ylsulfanylmethyl thiocyanate.

In addition, depending on the component ratios and concentrations utilized, the release agent of the present invention may also utilize additional surfactants or combinations thereof as emulsifiers or hydrotropes to form stable solutions so long as they do not affect the operation of the release agent in terms of release and corrosion protection. It is understood that the addition of these optional components does not take away from the scope of the invention. Some examples which would be familiar to those skilled in the art are alcohol ethoxylates, sodium xylene sulfonate, etc.

Once formulated, the composition of the present invention is used as a release agent for the manufacture of engineered wood products from ligno-cellulosic fibers, chips, strands or particles, in particular wood fibers or chips, utilizing pMDI as the adhesive, The composition of the present invention is applied to either the surface of the mat of ligno-cellulosic fibers, chips, strands or particles used to form the engineered wood product or to the surfaces of the metal caul plates, press platens, screens or belts used in the presses. The application method is dependent on the press style and capabilities. Typically, the release agent would be applied to the formed mat in multi-opening (daylight) presses whereas it is applied to the metal press surfaces in continuous style presses. In order to make the application process easier, it is preferred if the release agent composition is diluted with water before application. The composition is generally applied to the metal press surfaces in continuous presses at an application rate of at least about 0.05 $g/m^2$ of the active ingredients and preferably at an application rate of at least about 0.1 $g/m^2$ of the active ingredients. When applying the composition to the surface of the mat fibers, application rates of at least about 0.5 $g/m^2$ of the active ingredients may be used. The composition of the present invention provides for excellent release of the finished wood product from the caul plates with reduced corrosion.

Those skilled in the art will appreciate the many possible variations within the scope of this invention. The following examples are illustrative of the preferred embodiments of the present invention, but the present invention is not limited to the examples.

Example 1—Preparation of Emulsified Release Agent Composition 65.4 gram of reverse osmosis (RO) water was weighed in a beaker and 12.3 gram of 45% KOH was added while mixing. Then 16.5 grams of Poly(oxy-1,2-ethanediyl), α-hydro-ω-hydroxy-monoC6-C12-alkyl ethers, phosphates (Interphone AEPE-Sialco materials LTD.) was added and mixed. 5.8 grams of a mixture of CS and CIO phosphate monoesters (Interphon MODPE Sialco materials LTD.) was added while mixing for 10 minutes. This formulation was AB-1 as set out in Table 1

Examples 2 to 13—Preparation of other Embodiments and Prior Art Formulations

Using the above method, other formulations as set out in Table 1 were prepared. A, B and C are representative of a), b) and c) respectively as outlined in the summary of invention. In addition, c) is represented by C1 (sulfonate), C2 (sulfate), C3 (disulfonate). In the examples provided: "A" is Poly(oxy-1,2-ethanediyl),a-hydro-w-hydroxy-monoC6-C12-alkyl ethers, phosphates, (CAS 68921-24-4), Interphon AEPE-Sialco materials LTD.; "B" is a mixture of C8 and C10 phosphate monoesters, (CAS 3921-30-0 and CAS 3991-73-9), Interphon MODPE-Sialco materials LTD.; "C1" is Sodium (C14-C16) olefin sulfonate, (CAS 68439-57-6), Bioterge AS-40-Stepan Company; "C2" is Sodium dodecyl sulfate, (CAS 151-21-3), Stepanol WA-100-Stepan Company; and "C3" is 1,1'-oxybisbenzene tetrapropylene derivatives, sulfonated, sodium salt, (CAS 119345-04-9) Calfax DB45-Pilot Chemical Company. Single component formulations A, B, C1 and C3 were prepared for comparison purposes. In addition, prior art formulations were prepared and identified as F1 and F2, where F1 is Coconut Fatty Acid, potassium salt (COFA), (CAS 61789-30-8) and F2 is representative of a formulation covered under U.S. Pat. No. 3,309,503 which utilizes a combination of fatty acid and phosphate ester.

TABLE 1

Release Agent Formulation

| Product ID | A | B | C1 | C3 | AB-1 | AB-2 | AC1 | AC2 | AC3 | BC1 | ABC1 | F1 | F2 |
|---|---|---|---|---|---|---|---|---|---|---|---|---|---|
| RO Water | 78.9 | 87.5 | 75.0 | 66.7 | 65.4 | 62.3 | 65.4 | 78.3 | 66.4 | 68.9 | 63.8 | 87.1 | 64.0 |
| A | 17.0 | | | | 16.5 | 12.3 | 8.6 | 9.2 | 8.9 | | 12.2 | | 13.5 |
| B | | 8.0 | | | 5.8 | 12.3 | | | | 4.1 | 6.4 | | |
| C1 | | | 25.0 | | | | 21.5 | | | 24.7 | 8 | | |
| C2 | | | | | | | | 9.2 | | | | | |
| C3 | | | | 33.3 | | | | | 19.9 | | | | |
| COFA | | | | | | | | | | | | 8.2 | |
| Oleic acid | | | | | | | | | | | | | 11.7 |

Example 14—Testing of the formulations for Release

The formulations as set out in Table 1 were tested for their release properties as set out below. Test parameters varied depending on the type of press (multi-opening or continuous).

Orientated Strand Board (OSB) panels were manufactured with commercial OSB strands that were screened to ≥3.175 mm strand size fractions, using a 914 mm×2438 mm BM&M deck screener. The screened strands were blended with a commercial fast cure pMDI resin at a rate of 6.0% solids and a commercial Emulsion wax (E-wax) at a rate of 1.5% solids. The resin and E-wax were applied in a drum blender with a spinning disk atomizer. The blended materials were formed into mats measuring 838 mm×838 mm with a 55/45 surface to core weight ratio. Moisture content of the mats was targeted at 7% for the surface and 4% for the core.

The press was used to form Orientated Strand Board (OSB) in the following configurations; mild or stainless steel top plate, blended strands (formed mat), sealed screen (864 mm×864 mm×1178 mm), fixed aluminum bottom plate. The press was run using either a multi-opening configuration which meant that the release agent was sprayed on the top of the formed mat or a continuous operation where the release agent was sprayed on the top plate. Prior to preparing the first board with each release agent, the top plate was cleaned with a cup brush and washed with acetone. The top plate was then heated in the press. Pre-conditioning of the top plate was performed by spraying approximately 8 g/ft² of the release agent diluted to 5% or 6.25% solids (continuous or multi-opening, respectively) into the press and allowing it to heat up and dry before proceeding.

The release agent was then sprayed at various application rates to either the top plate or the mat top surface prior to pressing. The panels were targeted for a density of 624 kg/m3 and a thickness of 11.0 mm, The panels were pressed at a temperature of 220°C. for 160 seconds, typical for the industry. After pressing, the panels were trimmed to 711 mm×711 mm and then measured for out-of-press thickness and density.

Results

The pressed panels were rated for the effectiveness of each release agent from (1) if the panel does not stick at all to the pressing plate to (4) if the panel is completely stuck to the pressing plate. Any press release rating is considered to be the application rate at which the formulation fails.

Detailed release ratings were assigned as follows:
Category 1 Full Release
1.00 No particles stuck to top plate
1.10 Very few small particles stuck to top plate
1.25 Small amount of particles stuck to top plate
1.50 Medium amount of particles stuck to top plate
1.75 Large amount of particles stuck to top plate
Category 2 Brief Hang-Up Release
2.00 No particles stuck to top plate
2.10 Very few small particles stuck to top plate
2.25 Small amount of particles stuck to top plate
2.50 Medium amount of particles stuck to top plate
2.75 Large amount of particles stuck to top plate
Category 3 Manual Release
3.00 No particles stuck to top plate
3,10 Very few small particles stuck to top plate
3.25 Small amount of particles stuck to top plate
3.50 Medium amount of particles stuck to top plate
3.75 Large amount of particles stuck to top plate
Category 4 Release Completely Stuck
4.00 Panel completely stuck to top plate The results are shown in Tables 2 and 3:

TABLE 2

Continuous press method tests.

| Applied Solids g/ft² | A | B | C1 | AB-1 | BC1 | F1 |
|---|---|---|---|---|---|---|
| 0.8 | 3.25 | 1.00 | 1.00 | 1.00 | 1.00 | 1.00 |
| 0.4 | 1.00 | 1.00 | 1.00 | 1.00 | 1.00 | 1.00 |
| 0.4 | 1.00 | | 1.00 | | | 1.00 |
| 0.2 | 1.10 | 2.10 | 2.10 | 1.10 | 1.00 | 1.00 |
| 0.2 | 1.25 | 2.10 | 1.10 | 1.10 | 1.00 | 1.10 |
| 0.2 | 1.10 | | | | | |
| 0.1 | 2.25 | 3.25 | 4.00 | 1.00 | 1.00 | 1.10 |
| 0.1 | 3.50 | 3.75 | | 1.00 | 1.00 | 2.50 |
| 0.1 | | | | | | 3.75 |
| 0.075 | | | | 1.10 | 2.10 | |
| 0.075 | | | | 1.10 | 2.10 | |
| 0.05 | | | | 1.10 | 3.25 | |
| 0.05 | | | | 1.10 | 3.25 | |
| 0.05 | | | | | | |
| 0.03 | | | | | 2.25 | |
| 0.03 | | | | | 3.25 | |

TABLE 3

Multi-Opening press method tests.

| Applied Solids g/ft² | A | B | C3 | Ab-2 | AC2 | AC3 | BC1 | ABC1 |
|---|---|---|---|---|---|---|---|---|
| 1.0 | 1.10 | 1.00 | 1.00 | 1.00 | 1.00 | 1.00 | 1.00 | 1.10 |
| 0.5 | 2.10 | 2.10 | | 1.10 | 1.10 | 1.10 | 1.00 | 1.00 |

TABLE 3-continued

Multi-Opening press method tests.

| Applied Solids g/ft² | A | B | C3 | Ab-2 | AC2 | AC3 | BC1 | ABC1 |
|---|---|---|---|---|---|---|---|---|
| 0.5 | 2.25 | 3.25 |  | 1.10 | 2.10 | 2.10 | 2.10 | 1.10 |
| 0.5 | 2.50 |  |  |  |  |  |  |  |
| 0.5 | 3.75 |  |  |  |  |  |  |  |
| 0.4 |  |  | 1.00 | 2.25 | 1.00 | 2.10 | 2.10 | 1.10 |
| 0.4 |  |  |  | 1.25 | 2.10 | 1.25 | 2.10 | 2.10 |
| 0.4 |  |  | 3.75 |  |  |  |  | 2.25 |
| 0.3 |  |  |  | 2.25 | 2.25 | 1.25 | 3.25 | 2.25 |
| 0.3 |  |  |  | 2.50 | 3.25 | 2.25 |  | 2.50 |
| 0.3 |  |  |  | 3.75 |  |  |  | 2.50 |
| 0.2 |  |  |  |  |  | 3.25 |  | 3.75 |

The mixture of the phosphate esters from group a) and b) performs significantly better than the pure compounds and the prior art formulations in continuous press operations. Optimal ratio of a) to b) found in these experiments is preferably about 3:1. The combination of a phosphate ester and an anionic sulfur containing surfactant also performed better than the pure compounds and prior art formulations in continuous press processes, although not as well as the mixture of the phosphate esters. in the continuous press operation, the pure compounds performed almost as well as the prior art formulations.

The mixture of the phosphate esters from group a) and b) performs better than the pure compounds in multi-opening press processes. Optimal ratio of a) to b) ratio found in these experiments is preferably about 1:1. The combination of one or more phosphate esters and an anionic sulfur containing surfactant also performed better than the pure compounds in multi-opening press processes. They also performed as good as or better than the mixture of phosphate esters from group a) and b).

Example 15—Testing the Corrosion Properties

The corrosion properties of the formulations were tested using the following method that mimicked the real multi-opening press process:

Using a 5"×5" plywood form, a small mat is prepared from 110 g OSB strands treated with 1.3% Wax, 6% pMDI and water up to the desired moisture content. The mat is moved to a mild steel bottom plate covered by a teflon sheet and mat top surface is sprayed with about 4 g of a 10% solids release agent. Two pre-weighted mild steel coupons (carbon steel 1018) are placed on the top of the mat and sprayed again. A mild steel plate pre-heated to 220° C. is placed on top of the formed mat/coupons and moved quickly into the 220° C. heated Carver Press. The press is closed until the pressure gauge reads 12,500 lbs. The pressure is maintained at 12.5700 lbs for 70 seconds and then the pressure is slowly released, After 195 seconds, the press is de-gassed and after 210 seconds the press is opened. The pressed panel is removed, while the top plate remains in the heated press. The coupons are flipped over. The top surface of the OSB board and the coupons are sprayed again with 4 grams of release agent, the hot top mild steel plate is placed on top of the board/coupons and the pressing procedure repeated. This process is repeated until the panel has been pressed a total of 6 times. After 6 presses, the panel is discarded, a new OSB mat formed and the procedure above is repeated using the same coupons and release agent. After a total of 30 press cycles the coupons are cleaned with a caustic based detergent followed by hot water. They are then soaked in inhibited hydrochloric acid (10%) for 120 seconds in an ultrasonic bath, washed with hot water, neutralized using an alkaline soap solution and dried with acetone. The weight loss of the coupons is recorded and corrected for a blank coupon treated with the same cleaning procedure and net weight loss converted to MPY (mils per year). These corrosion rates are then normalized to the corrosion rate for RO water.

TABLE 4

Relative corrosion of the release agents of the present invention, compared to traditional release agents containing fatty acids. The corrosion of RO water is used as a reference.

| Product ID | Relative Corrosion Release agent (mpy)/ RO Water (mpy) |
|---|---|
| RO Water | 1 |
| A | 0.23[JW8][JW9] |
| B | 0.57[JW10] |
| C1 | 1.91 |
| AB-1 | 0.49 |
| AB-2 | 0.66 |
| AC1 | 0.51 |
| AC3 | 0.54 |
| BC1 | 0.440[PT11] |
| ABC-1 | 0.77 |
| F1 | 5.00 |
| F2 | 3.73 |

The results of these tests dearly showed that:

a) The release agents of the present invention showed very low corrosion rates, even lower than the base line for RC) Water.

b) The results also show that the release agents of the present invention in fact inhibit the corrosion of water and vapors that are emitted during the pressing of composite panels.

The prior art products containing fatty acids in different proportions had very high corrosion, which will he aggressive especially to mild steel surfaces used in both continuous and multi-opening presses, such as the mild steel plates used in Multi-Opening presses, The individual anionic surfactants on their own, not in combination, also demonstrated reduced corrosion as compared to the prior art, and, as set out above in Tables 2 and 3, also demonstrated acceptable release properties, although not as good as the formulations of the present invention. There may however be certain applications where the use of the individual anionic surfactant would be acceptable, based upon the application and the requirements as they provide release characteristics similar to the prior art formulations, while having lower corrosion.

The release agents of the present invention provide for release properties equivalent to or better than the prior art formulations while providing significantly reduced corrosion of the metal parts of the presses on their own without the addition of other anti-corrosion agents. The low corrosion release agents of the present invention provide for protection of the metal surfaces of the presses used in the pressing of composite panels. By accomplishing this without the addition of separate anti-corrosion agents, the cost and the complexity of manufacture of the release agents is reduced. This provides significant benefits to the industry.

Although various preferred embodiments of the present invention have been described herein in detail, it will be appreciated by those skilled in the art that variations may be made thereto without departing from the appended claims.

The embodiments of the invention in which an exclusive property or privilege is claimed are defined as follows:

1. An external release agent less corrosive than Reverse Osmosis purified water for ligno-cellulosic composite panels comprising two or more anionic surfactants selected from the following groups,
   a) an ethoxylated phosphate ester or a salt thereof having the formula wherein,

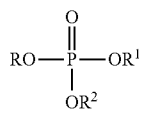

R, $R^1$ and $R^2$ are independently selected from the group consisting of H, and C6-C30 alkyl chain having an average of 1-20 moles of ethoxylation with the proviso that at least one of R, $R^1$ and $R^2$ is H and the other one or two of R, $R^1$ and $R^2$ is C6-C30 alkyl chain having an average of 1-20 moles of ethoxylation;
   b) a phosphate ester or a salt thereof having the formula wherein,

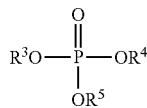

$R^3$ $R^4$ and $R^5$ are independently selected from the group consisting of H, and C6-C18 alkyl chain,
with the proviso that at least one of $R^3$, $R^4$ and $R^5$ is H and the other one or two of $R^3$, $R^4$ and $R^5$ is C6-C18 alkyl chain, and
   c) an organic sulfur containing anionic surfactant or a salt thereof, wherein:
at least one of the anionic surfactants is selected from a) and at least one of the anionic surfactants is selected from b);
the at least one anionic surfactant selected from a) is present at a concentration of 2 - 45% by weight;
the at least one anionic surfactant from b) is present at a concentration of 2-45% by weight; and
the release agent further comprises 10-96% by weight water and optionally an agent to adjust the pH of the composition.

2. The external release agent as claimed in claim 1 wherein, the release agent composition comprises
   (a) 2-25% by weight of one or more phosphate esters selected from a);
   (b) 2-25% by weight of one or more phosphate esters selected from b); and
   (c) 50-96% by weight water and optionally an agent to adjust the pH of the composition.

3. The external release agent as claimed in claim 1 wherein, the release agent composition comprises
   (a) 5-21% by weight of one or more phosphate esters selected from a);
   (b) 2-15% by weight of one or more phosphate esters selected from b); and
   (c) 65-93% by weight water and optionally an agent to adjust the pH of the composition.

4. The external release agent as claimed in claim 1 wherein, the ratio of the phosphate ester selected from a) to the phosphate ester selected from b) is between 1:6 and 6:1 by weight.

5. The external release agent as claimed in claim 1 wherein, the ratio of the phosphate ester selected from a) to the phosphate ester selected from b) is between 1:4 and 4:1 by weight.

6. The external release agent as claimed in claim 1 wherein, the ratio of the phosphate ester selected from a) to the phosphate ester selected from b) is between 1:3 and 3:1 by weight.

7. The external release agent as claimed in claim 1, wherein one or two of R, $R^1$ and $R^2$ is C6-C12 alkyl having an average of 1-12 moles of ethoxylation and one or two of $R^3$, $R^4$ and $R^5$ is C8-C16 alkyl.

8. The external release agent as claimed in claim 1 wherein, the phosphate ester of group a) is Poly(oxy-1,2-ethartediyl),α-hydro-ω-hydroxy-monoC6-C12-alkyl ethers, phosphates and the phosphate ester of group b) is a mixture of C8 and C14 alkyl phosphate esters.

9. The external release agent as claimed in claim 1, wherein the organic sulfur containing anionic surfactant is a sulfonate, sulfate or a disulfonate.

10. The external release agent as claimed in claim 9, wherein the salt of the sulfonate has the formula

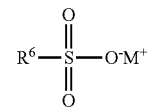

wherein $R^6$ is a C6-C24 carbon chain which may be aliphatic or aromatic, linear or branched, saturated or unsaturated, ethoxylated or propoxylated or combinations thereof and M is a monovalent cation;
wherein the sulfate has the formula

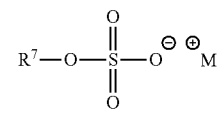

where $R^7$ is a C6-C24 carbon chain which may be aliphatic or aromatic, linear or branched, saturated or unsaturated, ethoxylated or propoxylated or combinations thereof and M is a monovalent cation; and
wherein the disulfonate has the formula

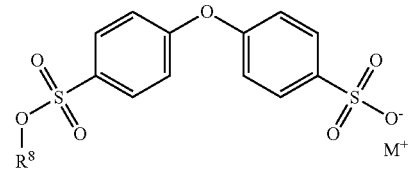

where $R^8$ is a C6-C24 carbon chain which he aliphatic or aromatic, linear or branched, saturated or unsaturated, ethoxylated or propoxylated or combinations thereof and M is a monovalent cation.

11. The external release agent as claimed in claim 10 wherein, the release agent composition comprises
   (a) 2-25% by weight of one or more phosphate esters selected from a) and/or b);
   (b) 2-25% by weight of one or more organic sulfur containing anionic surfactants; and
   (c) 50-96% by weight water and optionally an agent to adjust the pH of the composition.

12. The external release agent as claimed in claim 10 wherein, the release agent composition comprises
   4-20% by weight of one or more phosphate esters selected from a) and/or b);
   (b) 2-25% by weight of the organic sulfur containing anionic surfactant; and
   (c) 55-94% by weight water and optionally an agent to adjust the pH of the composition.

13. The external release agent as claimed in claim 10 wherein, $R^6$ is a C12-C18 alpha olefin group, $R^7$ is a C8-C16 alkyl group, $R^8$ a C10-C16 alkyl group, and M is Na.

14. The external release agent as claimed in claim 13 wherein, $R^6$ is a C14-C16 alpha olefin group, $R^7$ is a C12 alkyl group, $R^8$ is a C12 alkyl group and M is Na.

15. The external release agent as claimed in claim 13, wherein one or two of R, R' and $R^2$ is C6-C12 alkyl having an average of 1-12 moles of ethoxylation and one or two of $R^3$, $R^4$ and $R^5$ is C8-C16 alkyl.

16. The release agent as claimed in claim 15 wherein, the phosphate ester of group a) is Poly(oxy-1,2-ethanediyl),α-hydro-ω-hydroxy-niono C6-C12-alkyl ethers, phosphates and the phosphate ester of group b) is a mixture of C8 and C10 alkyl phosphate esters.

* * * * *